US011880323B2

(12) United States Patent
Disterheft et al.

(10) Patent No.: US 11,880,323 B2
(45) Date of Patent: Jan. 23, 2024

(54) SYSTEM AND METHOD FOR BUILDING AND IMPLEMENTING AUTOMATED WORKFLOWS

(71) Applicant: RELATIVITY ODA LLC, Chicago, IL (US)

(72) Inventors: Kyle Disterheft, Lombard, IL (US); Pablo Bernal Alcazar, Chicago, IL (US); Alexander Hodges, Chicago, IL (US); Brian Wittenberg, Park Ridge, IL (US); Daniel Miller, Chicago, IL (US); Jakub Jezusek, Chicago, IL (US); Orin Xie, Chicago, IL (US); Vladimir Kolmakov, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 250 days.

(21) Appl. No.: 17/152,985

(22) Filed: Jan. 20, 2021

(65) Prior Publication Data
US 2021/0232992 A1    Jul. 29, 2021

Related U.S. Application Data

(60) Provisional application No. 62/966,897, filed on Jan. 28, 2020.

(51) Int. Cl.
*G06Q 10/06* (2023.01)
*G06F 13/38* (2006.01)
(Continued)

(52) U.S. Cl.
CPC ............ *G06F 13/38* (2013.01); *G06F 3/0482* (2013.01); *G06Q 10/0633* (2013.01); *G06V 30/40* (2022.01)

(58) Field of Classification Search
CPC ...................................................... G06Q 10/06
(Continued)

(56) References Cited

U.S. PATENT DOCUMENTS

2007/0288258 A1* 12/2007 Beringer ............ G06Q 10/0633
705/7.27
2015/0370540 A1* 12/2015 Coslovi .................... G06F 8/20
717/121

(Continued)

OTHER PUBLICATIONS

Azure Logic Apps, retrieved from Wayback Machine for Dec. 30, 2019, Retrieved from the Internet at: <URL:https://web.archive.org/web/20191230160912/https://azure.microsoft.com/en-us/services/logic-apps/> (2019).

*Primary Examiner* — Nga B Nguyen
(74) *Attorney, Agent, or Firm* — MARSHALL, GERSTEIN & BORUN LLP; Randall G. Rueth

(57) ABSTRACT

Techniques for building automated workflow sequences associated with a document review platform are provided. A method includes accessing trigger event data from a trigger event database and action data from an action database; presenting a user interface to create a workflow; adding a function block to the workflow by: detecting a selection of an add function block option; presenting a function block including at least one of (i) a user-selectable option to select a trigger event from a list of trigger events populated based on the trigger event data or (ii) a user-selectable option to select an action from a list of actions populated based on the action data; and presenting the function block including at least one of a selected trigger event or a selected action; detecting that the workflow is ready for deployment; translating the workflow into a logic-based representation of the workflow; and deploying the logic-based representation.

27 Claims, 9 Drawing Sheets

(51) Int. Cl.
*G06Q 10/0633* (2023.01)
*G06F 3/0482* (2013.01)
*G06V 30/40* (2022.01)

(58) Field of Classification Search
USPC .......................................... 705/7.27
See application file for complete search history.

(56) References Cited

U.S. PATENT DOCUMENTS

| | | | |
|---|---|---|---|
| 2016/0291911 A1* | 10/2016 | Liebelt | G06F 3/1273 |
| 2017/0048285 A1* | 2/2017 | Pearl | G06F 16/11 |
| 2017/0255887 A1* | 9/2017 | DeLay | H04L 63/10 |
| 2019/0370749 A1* | 12/2019 | Milvaney | G06F 16/93 |
| 2020/0007615 A1* | 1/2020 | Brebner | G06F 9/542 |
| 2020/0133711 A1* | 4/2020 | Webster | G06F 8/30 |
| 2020/0210383 A1* | 7/2020 | Demaris | G06F 16/168 |

\* cited by examiner

SYSTEM AND METHOD FOR BUILDING AND IMPLEMENTING AUTOMATED WORKFLOWS

CROSS-REFERENCE TO RELATED APPLICATIONS

This application claims the benefit of U.S. Provisional Patent Application No. 62/966,897, entitled "System and Method for Building and Implementing Automated Workflows" and filed Jan. 28, 2020, the disclosure of which is expressly incorporated by reference herein in its entirety.

FIELD OF DISCLOSURE

The present disclosure relates generally to building automated workflows, and, more particularly, to systems and methods for building automated workflows for document review processing.

BACKGROUND

In various applications, a need exists to extract meaningful information from a corpus of electronic communication documents. In the discovery process commonly associated with litigation, for example, attorneys are commonly provided a voluminous corpus of electronic communication documents that conform to discovery requests. Electronic discovery (eDiscovery) software has been introduced to perform some of the tasks related to the discovery process. However, electronic discovery requires a wide variety of tasks related to ingestion, organization, and analysis of documents.

A system administrator of an electronic discovery or document review software system must set up an overwhelmingly large number of these tasks during the course of a legal case. Many of these tasks are identical across cases. Further, the order in which these tasks must be completed is often repeated during a case and during other cases. However, currently system administrators must create and initialize these tasks manually, often spending hours each day setting up jobs and waiting for certain operations to complete before they can initialize another task.

In addition, the wide variety of document review-related tasks are often associated with different computing systems and/or applications. These different systems and applications may have different control mechanisms and may require different interfaces and methods to initialize, operate, and monitor. Further, the systems and applications may lack ways to communicate with each other. Thus, automation of sequences of tasks associated with these disparate, discrete systems is challenging.

SUMMARY

In an embodiment, a system for building automated workflow sequences associated with a document review platform is provided. The system includes a trigger event database configured to store trigger event data and an action database configured to store action data. The system further includes one or more processors and one or more non-transitory memories coupled to the one or more processors, the trigger event database, and the action database and storing instructions thereon. The instructions are associated with a first application of the document review platform. Further, the instructions, when executed by the one or more processors, cause the one or more processors to: access, from the trigger event database, the trigger event data; access, from the action database, the action data; and present a workflow editor user interface to create a workflow. The workflow editor user interface includes: (i) an add function block user-selectable option; (ii) one or more function blocks of the workflow, wherein the workflow editor user interface adds a function block to the workflow when the workflow editor user interface detects a selection of the add function block user-selectable option; and (iii) one or more relationship elements between the one or more function blocks. The one or more function blocks include at least one of (i) a user-selectable option to select a trigger event from a list of trigger events populated based on the trigger event data or (ii) a user-selectable option to select an action from a list of actions populated based on the action data. The instructions further cause the one or more processors to: detect an indication that the workflow is ready for deployment, the workflow including one or more trigger events and one or more actions; translate the workflow into a logic-based representation of the workflow; and deploy the logic-based representation of the workflow. Deploying the logic-based representation of the workflow causes a data bus monitor to monitor a data bus for occurrences of the one or more trigger events.

In another embodiment, a method for building automated workflow sequences associated with first application of a document review platform is performed by one or more processors. The method includes accessing trigger event data from a trigger event database and action data from an action database. The method also includes presenting a workflow editor user interface to create a workflow, wherein the workflow editor user interface includes an add function block user-selectable option. Further, the method includes adding a function block to the workflow by: (1) detecting a selection of the add function block user-selectable option; (2) presenting, via the workflow editor user interface, a function block in response to detecting the selection of the add function block user-selectable option, the function block including at least one of (i) a user-selectable option to select a trigger event from a list of trigger events populated based on the trigger event data or (ii) a user-selectable option to select an action from a list of actions populated based on the action data; and (3) presenting the function block including at least one a selected trigger event or a selected action. The method further includes detecting an indication that the workflow is ready for deployment, the workflow including one or more trigger events and one or more actions; translating the workflow into a logic-based representation of the workflow; and deploying the logic-based representation of the workflow. Deploying the logic-based representation of the workflow causes a data bus monitor to monitor a data bus for occurrences of the one or more trigger events.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

I. Overview

Figure 1A:
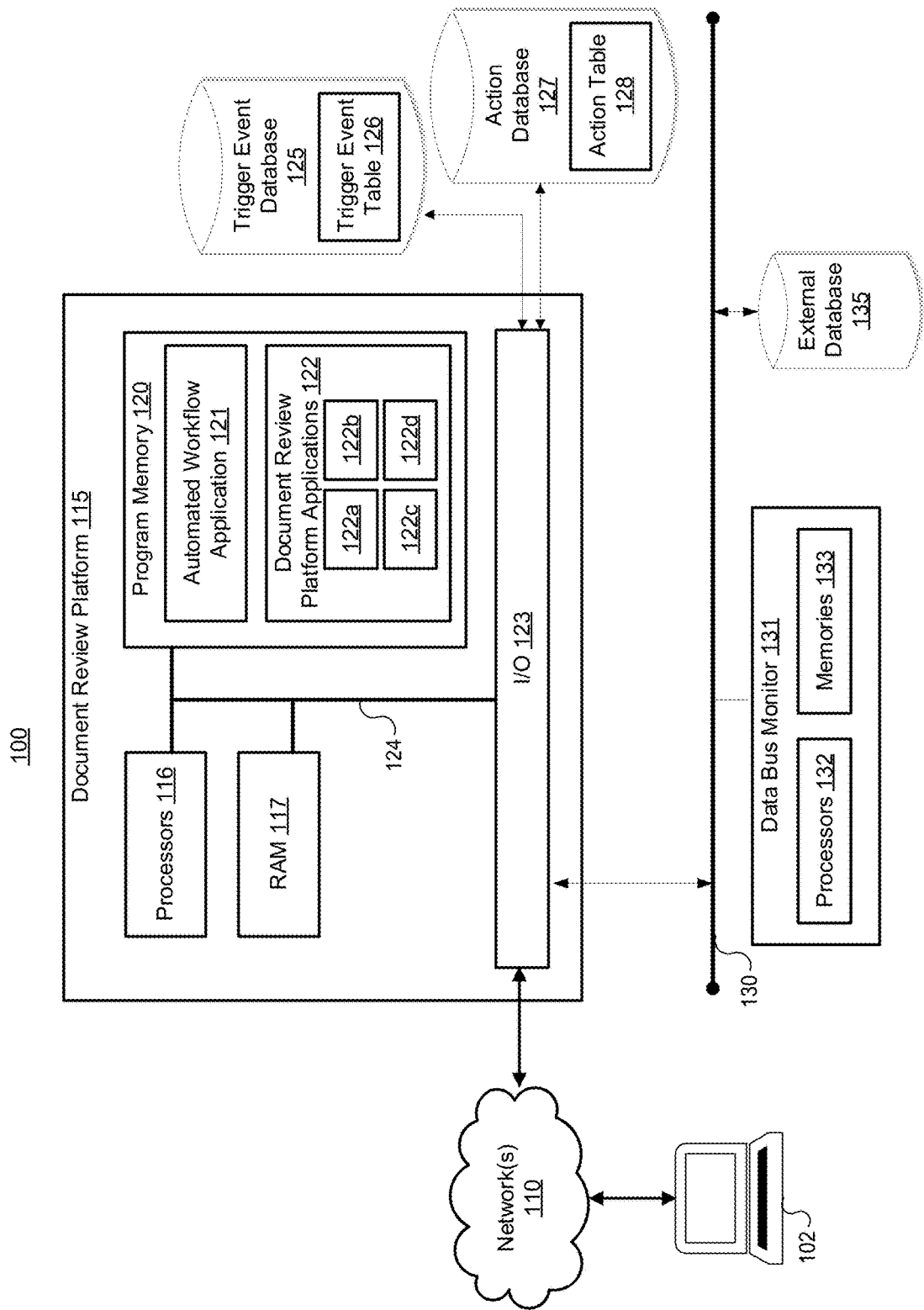
FIGS. 1A-1C illustrate an example environment including components configured to implement the automated workflow techniques described herein.

The embodiments described herein relate to, inter alia, building and deploying automated workflows associated with a document review platform. The systems and techniques described herein may be used, for example, to build a workflow including sequences of trigger events and actions and to deploy the workflow on a distributed computing environment. Although the present disclosure generally describes the techniques' application to the eDiscovery and/or litigation context, other applications are also possible. For example, the systems and methods described herein may be used to generate automated sequences of computational tasks outside the document review context, or computational tasks outside the eDiscovery context.

According to the techniques of this disclosure, in order to design a workflow, a user interacts with an automated workflow application of a document review platform using a client device. The automated workflow application causes the client device to display user interfaces for designing the workflow. The user may design a workflow, including desired trigger events and sequences of actions, by interacting with the user interfaces. The automated workflow application translates the designed workflow into a logic-based representation of the workflow and deploys the logic-based representation of the workflow. In some implementations, the automated workflow application deploys the logic-based representation to a data bus monitor configured to monitor a data bus connecting computing devices of a distributed computing environment. The logic-based representation of the designed workflow instructs the data bus monitor (a) which trigger events to monitor for and (b) which actions to perform and in what sequence following a trigger event or completion of another action. Because the data bus monitors for trigger event occurrences and automatically instructs devices and/or applications to perform actions, in accordance with the logic-based representation of the workflow, a user does not need to manually monitor for certain events to occur or manually initialize tasks in the workflow.

The systems and methods discussed herein offer numerous benefits. As mentioned previously, many document review-related tasks are carried out by different systems. The techniques disclosed herein centralize the automation process and enable automation of sequences of tasks performed by these discrete components. For example, in a workflow built using the methods of this disclosure, system A completing an event may trigger a different system B to perform an action, automatically and without the need for user intervention.

Furthermore, by building and deploying workflows comprised of sequences of trigger events and actions, the techniques herein greatly reduce the amount of time a user must spend manually designating tasks. Moreover, a computing system can execute a deployed workflow without needing to seek feedback from the user between tasks, reducing processing time. Workflows can also be saved as templates, so a user does not need to re-specify a common order of tasks. After a workflow is saved, a user can re-use the existing workflow or modify the existing workflow for additional custom applications, resulting in both (a) less manual time for the user spent designing workflows and (b) less processing time for the computing system. Still further, the techniques discussed herein include presenting user interfaces which make designing a workflow a simple process for the user. It should be appreciated that other benefits are envisioned.

In addition, the systems and methods do not merely automate manual tasks using a computer. Rather, the techniques discussed herein include generating, based on received user input designating a desired workflow, a logic-based representation of the workflow, a novel structure that previously would not be created or envisioned by a human. Further, the logic-based representation of the workflow includes instructions for monitoring for trigger events and initializing actions which a human also would not be capable of executing.

II. Example Environment for Building Automated Workflows

Figure 1B:
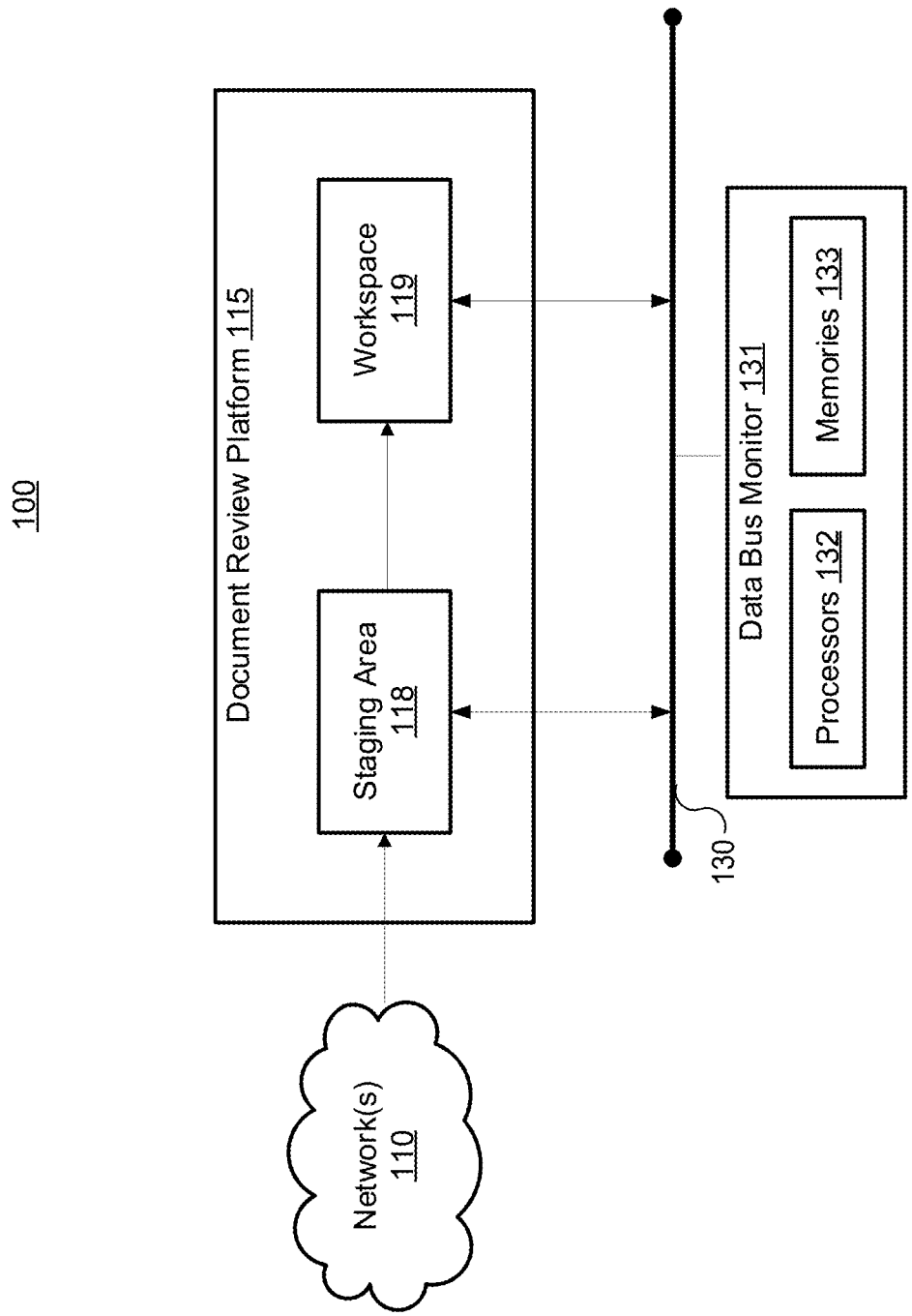
Figure 1C:
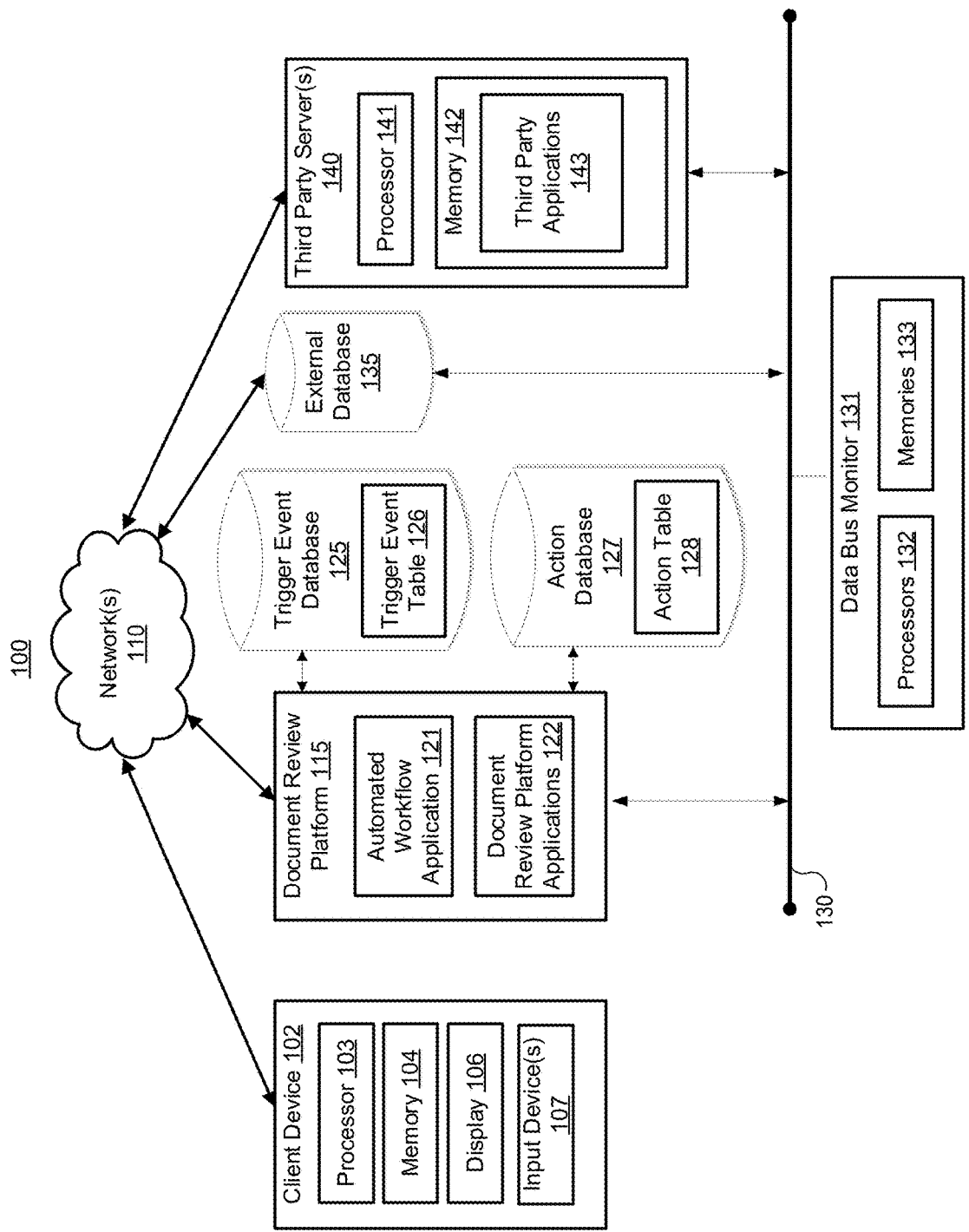

FIGS. 1A-1C illustrate an example environment 100 including components configured to implement the automated workflow techniques described herein. The environment 100 includes a client device 102, a document review platform 115, network(s) 110, and a data bus 130. The document review platform 115 is configured to provide applications for building and deploying the automated workflows discussed herein and may be operated by a provider of document review services such as eDiscovery services. FIGS. 1A-1B illustrate the example environment 100 and the individual components that the document review platform 115 may include. FIG. 10 also illustrates example environment 100, but depicts additional components that may be included in the environment 100. The document review platform 115 may be operated by a provider of document review services such as eDiscovery services.

The components of the environment 100 (e.g., the client device 102 and the document review platform 115) are communicatively coupled via one or more wired or wireless network(s) 110 that facilitate any current or future-developed standard or technology (e.g., GSM, CDMA, TDMA, WCDMA, LTE, EDGE, OFDM, GPRS, EV-DO, UWB, IEEE 802 including Ethernet and Wi-Fi, WiMAX, Bluetooth, and others).

The document review platform 115 includes one or more processors 116 configured to execute instructions that form the various applications of the document review platform 115 described herein. The processors 116 may include central processing units (CPUs), graphics processing units (GPUs), application-specific integrated circuits (ASICS), and/or any other types of computer processors. It should be appreciated that while FIGS. 1A-1C illustrate the document review platform 115 as a single entity, in other embodiments, the document review platform 115 may be multiple entities acting in conjunction with one another. For example, in some embodiments, the document review platform 115 is partially or wholly implemented in a distributed computing environment, such as a cloud computing environment. In these embodiments, the processors 116 may be physically located in different hardware entities (e.g., servers).

In addition to the processors 116, in the illustrated embodiment the document review platform 115 also includes a program memory 120, a random-access memory (RAM) 117, and an input/output (I/O) circuit 123, all of which may be interconnected via an address/data bus 124. It should be appreciated that the memory of the document review platform 115 may include multiple RAMs 117 and multiple program memories 120 implemented as any type of memory, such as semiconductor memory, magnetically readable memory, or optically readable memory, for example. Similarly, although the I/O circuit 123 is shown as a single block, it should be appreciated that the I/O circuit 123 may include a number of different types of I/O circuits. For example, the I/O circuit 123 may include one or more transceiver circuits to facilitate communication over the networks 110 and the data bus 130.

The program memory 120 may store any number of applications, routines, tools, or other collections of computer-readable instructions that support the techniques described herein. For example, the program memory 120 includes an automated workflow application 121 configured to support building and generating the automated workflows using the techniques discussed herein. While the automated workflow application 121 is depicted as being stored on the program memory 120, the automated workflow application 121 may be wholly or in part hosted on a cloud computing environment accessible by the document review platform 115. In addition, the client device 102 may include a companion application that interfaces with the automated workflow application 121 (e.g., a web browser or an application provided by the document review platform 115).

The program memory 120 may store other document review platform applications 122 (e.g., document review platform applications 122a-d) configured to support other document review services and functions. For example, the document review platform applications 122 may include an importation application 122a configured to support collection and ingestion of new documents into the document review platform 115, as discussed in further detail below with respect to FIG. 1B. A search application 122b may support constructing search indices and performing searches of documents stored at the document review platform 115 or stored at devices communicatively connected to the document review platform 115. In addition, an analytics application 122c may support various analysis techniques applied to documents by the document review platform 115. Further, an imaging application 122d may support functions related to analyzing and extracting data from images of documents. As noted above, the document review platform applications 122 may also be implemented by the document review platform 115 in a cloud computing environment.

The document review platform 115 is communicatively coupled to a data bus 130 that is monitored by a data bus monitor 131. The automated workflow application 121 and the document review platform applications 122, for example, may write data to and receive data from a data bus 130. When components of the environment 100 initiate or perform actions, data relating to these actions may be written to the data bus 130. The data bus monitor 131 may include one or more processors 132 and one or more memories 133 storing instructions executable by the processors 132. As one example, the document review platform applications 122 may, after performing a given function, post information concerning the completed function to the data bus 130. As another example, the document review platform 115 may receive data from an external database 135 via the data bus 130. The external database 135 may store information and documents relevant to the functions of the document review platform applications 122. As a further example, the data bus monitor 131 may be configured to write instructions to the data bus 130 for execution by the document review platform applications 122 or the third party applications 143 (e.g., instructions formatted in accordance with an application programming interface (API)).

As an additional note, while not shown in FIG. 1, it is understood that the data bus monitor 131 may also be communicatively coupled to the other components of the environment 100 via the network(s) 110. The document review platform 115, for example, may deploy logic-based representations of workflows to the data bus monitor 131 via network(s) 110.

In order to design the workflows described herein, a user interacts with the automated workflow application 121 using the client device 102. The automated workflow application 121 causes the client device 102 to display user interfaces for designing a workflow, as will be discussed with reference to FIGS. 2-4. The user may design a workflow, including desired trigger events and sequences of actions, by interacting with the user interfaces. The automated workflow application 121 translates the designed workflow into a logic-based representation of the workflow. The automated workflow application 121 then deploys the logic-based representation of the workflow to the data bus monitor 131, as will be discussed with reference to FIG. 5. The logic-based representation of the workflow instructs the data bus monitor 131 (a) which trigger events to monitor for and (b) which actions to perform and in what sequence following a trigger event or completion of another action. In this way, the data bus monitor 131 may also be described as an automation orchestrator that manages execution of the workflow tasks after the workflow is deployed.

To populate user interfaces of the automated workflow application 121 and to generate logic-based representations of designed workflows, the document review platform 115 accesses a trigger event database 125 and an action database 127. The trigger event database 125 includes a trigger event table 126 storing trigger event data for trigger events registered with the document review platform 115. Similarly, the action database 127 includes an action table 128 storing action data for actions registered with the document review platform 115. While depicted in FIGS. 1A and 1C as two separate databases, the trigger event database 125 and the action database 127 may be part of a single database. The databases 125, 127 may utilize any known database architectures. Further, each of the databases 125, 127 may be implemented using cloud technology and may reside on a distributed network of computing devices rather than a single computing device.

The trigger event data and action data may include definitions of trigger events and actions, respectively. The trigger event definitions instruct the data bus monitor 131 what data parameters to monitor for and/or what devices/other data buses to monitor in order to determine whether a given trigger event has occurred. For example, a trigger event definition may indicate a particular parameter (and/or state or value thereof) or data and/or an identifier associated with a device or data bus. The trigger event definitions may correspond to particular types of trigger events (e.g., particular types of document review tasks). Further, the trigger event definitions may include different fields related to the different trigger event types. For example, a particular type of document review task may have different options associated with the task, as will be further discussed with reference to FIG. 2.

Similarly, the action definitions instruct the data bus monitor 131 how to initialize the actions in the workflow. For example, an action definition may indicate a mapping of parameters to a format corresponding to an application programming interface (API). Said another way, the action definition may indicate how to format given parameters in order to call a function defined by an API to initialize a particular function. The action definitions may correspond to particular types of actions (e.g., particular types of actions). As with trigger event definitions, the action definitions may include different fields related to the different action types, as will be further discussed with reference to FIG. 2.

The automated workflow application 121 configures user interfaces to present to a user trigger events and actions that are available for the user to include in a workflow. More particularly, the automated workflow application 121 populates the lists of available trigger events and actions by accessing the trigger event database 125 and the action database 127. Further, when the automated workflow application 121 translates the workflow into a logic-based representation of the workflow, the automated workflow application 121 includes in the logic-based representation of the workflow the definitions of the trigger events and actions included in the workflow. The automated workflow application 121 then deploys the logic-based representation of the workflow to the data bus monitor 131 which uses the logic-based representation of the workflow to execute the workflow. Said another way, the definitions of the trigger events and the actions included in the logic-based representation of the workflow instruct the data bus monitor 131 how to execute the workflow.

FIG. 1B illustrates how the document review platform 115 may import documents. The document review platform 115 may include a staging area 118 and a workspace 119. The staging area 118 and the workspace 119 may be segments of memory and may be implemented on different computing devices, the same computing device, or a distributed network (e.g., a distributed cloud computing environment). The document review platform 115 may apply (i) a collection process and (ii) an ingestion process to documents the document review platform 115 receives from the network 110, as described below. The importation application 122a may be configured to support the collection and the ingestion processes.

The collection process occurs at the staging area 118. Initially, the document review platform 115 may, via the network 110, collect a corpus of documents into the staging area 118 from one or more sources. For example, the document review platform 115 may collect the corpus of documents from sources such as external applications, portals, web sites, etc. The corpus of documents may include emails, spreadsheets, images, text files, etc.

After the corpus of documents is collected into the staging area 118 during the collection process, the documents are ingested to the document review platform 115 during an ingestion process. During the ingestion process, the document review platform 115 imports or "ingests" documents from the staging area 118 to the workspace 119. During the ingestion process, the document review platform 115 may apply perform various pre-processing actions on the documents before the documents are ingested to the workspace.

For example, in the case of email documents, the collected email documents may include multiple email documents from the same email conversation. Email replies to a first or "root" email in the conversation may include a segment containing new information (e.g., the text of the reply) and a segment containing information included in earlier emails. The document review platform 115 may pre-process documents to generate threaded email conversations by linking documents or portions of documents containing information not conveyed by other documents (i.e., unique documents) within the same email conversation. The threaded email conversations may be what is ingested to the workspace 119, instead of or in addition to the raw, collected email documents. As another example, in the case of images (e.g., portable document format (PDF) documents), the document review platform 115 may pre-process the images by applying optical character recognition (OCR) techniques to convert the images into text. The converted text may be ingested to the workspace 119. As yet another example, a pre-processing action may include highlighting or tagging portions of images or text files (which may be converted image files). For instance, a pre-processing action may correspond to highlighting keywords appearing in text files, in accordance with rules associated with the workspace 119. The documents including the highlights and tags may be ingested to the workspace 119.

After the documents have been ingested into the workspace 119, the document review platform 115 may apply various document review techniques, such as those supported by the search application 122b, analytics application 122c, and imaging application 122d, to the documents in the workspace 119.

The staging area 118 and the workspace 119 may be communicatively connected to the data bus 130, and may post to the data bus 130 when a document enters the staging area 118 or the workspace 119, respectively. Accordingly, one example trigger event may correspond to the document review platform 115 collecting a document or set of documents at the staging area 118. Another example trigger event may correspond to the document review platform 115 ingesting a document or set of documents into the workspace 119. Example actions may include application of pre-processing techniques to the documents during the ingestion process and application of document review techniques to the documents in the workspace 119. Example trigger events and actions are discussed in further detail below with respect to FIG. 2.

Continuing to FIG. 1C, the client device 102 can be a mobile phone, a desktop computer, a laptop computer, a tablet, a smart wearable device, a home personal assistance device, or any other suitable type of computing device. The client device 102 includes a processor 103, a memory 104, a display 106, and one or more input device(s) 107. As with processors 116, the processor 103 may include one or more CPUs, GPUs, ASICS, and/or any other type of computer processor. The processor 103 may execute instructions stored on the memory 104. As with the memories 117 and 120, the memory 104 may be implemented as any type of suitable memory. As mentioned previously, the client device 102 may include a companion application that interfaces with the automated workflow application 121.

The display 106 may be integral or external to the client device 102 and may use any suitable display technology (e.g., LED, OLED, LCD, etc.). The input device(s) 107 are configured to enable the client device 102 to accept inputs from the user. Accordingly, the user of the client device 102 may access and interact with the automated workflow application 121 and the user interfaces of the automated workflow application 121 using the display 106 and the input device(s) 107. In some embodiments, the input device(s) 107 include components that are integral to the client device 102. For example, the input device(s) 107 may include a mouse, a keyboard, a trackball device, a microphone, etc. Additionally or alternatively, the input device(s) 107 may include exterior components that are communicatively coupled to the client device 102. As an example, the display 106 and the input device(s) 107 may be integrated, as part of a touchscreen display.

The environment 100 also includes one or more third party server(s) 140. The third party servers 140 may each include a processor 141 and a memory 142 storing instructions executable on the processor 141. The memory 142 may store third party applications 143. The third party applications 143 may provide social media services, messaging services, calendar services, search services, etc. The third party server(s) 140 may include distributed servers forming a cloud network. Further, the third party server(s) 140 and/or the external database 135 may serve as sources of documents that may be imported to the document review platform 115 during the collection and ingestion processes described above.

In some embodiments, the third party servers 140 may, like the external database 135 and the document review platform 115, read data from and write data to the data bus 130. For example, after performing a certain operations, the document review platform applications 122 and/or the third party applications 143 may, write data to the data bus 130 to cause another component to perform an action. In other embodiments, the data monitor 131 establishes a direct communication link (e.g., via the internet other communication network) to initiate functionality associated with the third party servers 140. The applications 122, 143, and 145 also may perform operations in response to messages transmitted over the data bus 130, such as messages from the data bus monitor 131 formatted in accordance with a corresponding API of the application. Trigger events and actions stored in trigger event database 125 and action database 127 may be associated with the devices and applications communicatively connected to the data bus 130.

The components of the environment 100 may also register trigger events and actions with the document review platform 115. For example, the automated workflow application 121, in response to a request from a user of the client device 102 or from a system administrator of the document review platform 115, may generate (or may cause another application of the document review platform 115 to generate) a definition of a trigger event or an action and store the new definition in the trigger event database 125 or the action database 127, respectively. The request from the user or the system administrator (which may be made using the user interfaces of the automated workflow application 121, as will be further described with reference to FIG. 2) includes information the automated workflow application 121 requires to generate a new definition.

Examples of trigger events and actions, definitions of which may be included in the trigger event database 125 or the action database 127, are discussed below with reference to FIG. 2 to further explain what is meant by trigger events and actions as described herein.

III. Example Interfaces and Methods for Building and Monitoring Automated Workflows It should be appreciated that the user interfaces depicted in FIGS. 2-4 and 6 are example embodiments. Thus, the systems and methods disclosed herein may be implemented using user interfaces that differ in appearance and capabilities from the user interfaces depicted in the figures.

Figure 2:
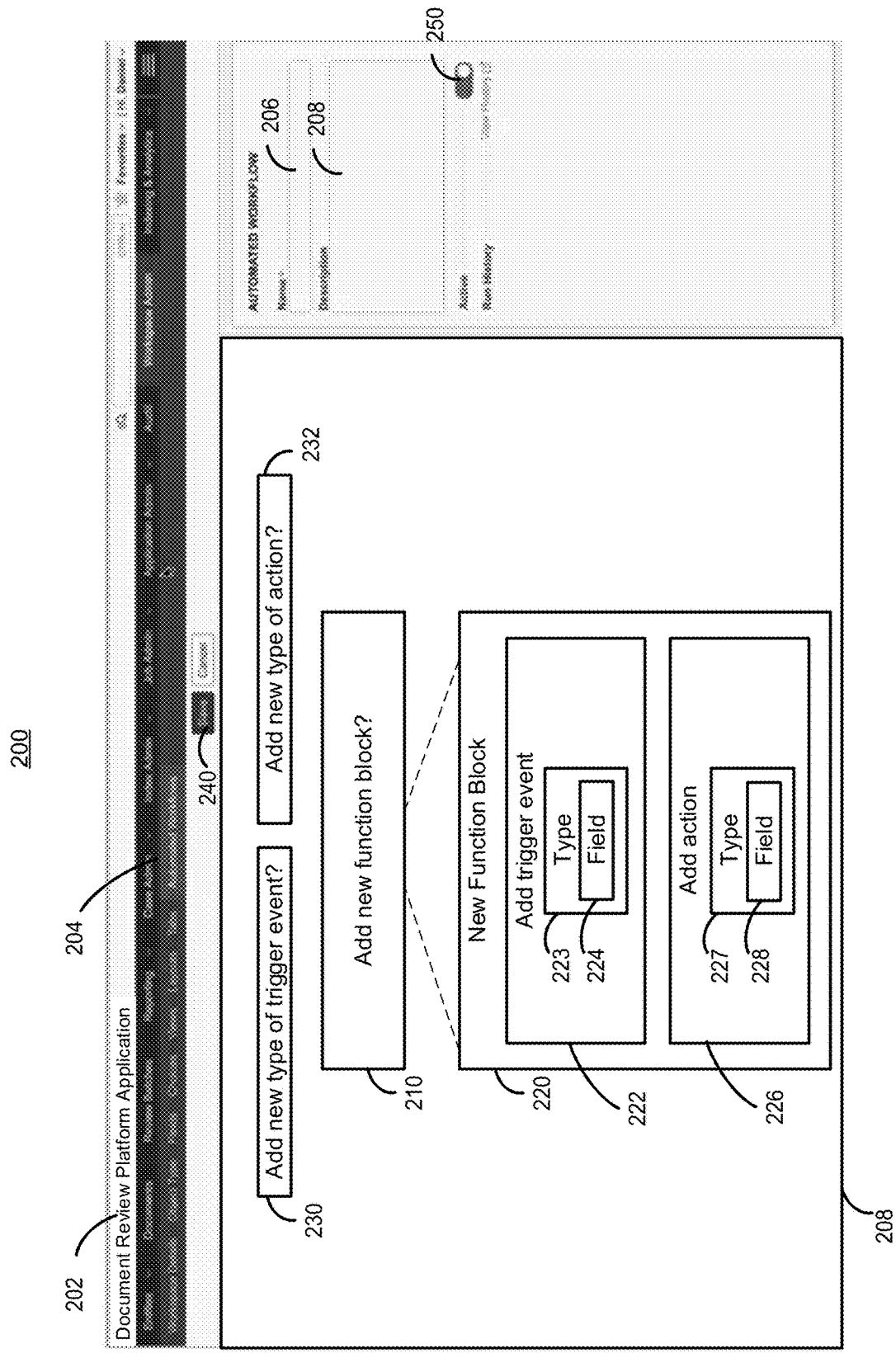
FIG. 2 is an example workflow editor user interface presented by a client device interacting with an automated workflow application of the document review platform, in accordance with an example embodiment.

FIG. 2 is an example workflow editor user interface 200 presented by the client device 102 interacting with the automated workflow application 121 of the document review platform 115 in order to design a workflow. The client device 102 may display the example workflow editor user interface 200 using the display 106. The client device 102 may implement the automated workflow application 121 as part of a larger document review platform application 202. A user of the document review platform application 202 may access the user interface 200 of the automated workflow application 121 by selecting an automated workflows option 204 in a menu of the document review platform application 202.

The workflow editor user interface 200 enables the user to customize a workflow that the user wishes the automate. After selecting the automated workflows option 204, the user may need to select additional sub-menu options in order to cause the client device 102 to display the workflow editor user interface 200. The workflow editor user interface 200 includes a name field 206 that the user can select. After selecting the name field 206, the user can enter a desired name for the workflow (e.g., "Workflow 1"). The workflow editor user interface 200 may also include a description field 208 that the user can select and utilize to enter desired notes regarding the workflow (e.g., "This workflow will perform a search index build following a time-based trigger event.").

The workflow user interface 200 includes a canvas area 208 containing various user-selectable options the user can interact with in order to design the workflow. The user may design the workflow by adding trigger events and actions to the canvas area 208, as will be discussed herein. The canvas area 208 includes a user-selectable "add new function block" option 210. After detecting user input indicating a selection of the add new function block option 210, the automated workflow application 121 displays via the user interface 200 a new function block 220. The new function block 220 may include a user-selectable option 222 to add a new trigger event and a user-selectable option 226 to add a new action. In some implementations, after the automated workflow application 121 detects selection of the trigger event user-selectable option 222, the user interface 200 may not display or may grey-out the user-selectable option 226 (and vice versa), such that each new function block is associated with either a trigger event or an action. In other implementations, the add new function block option 210 may be divided into two separate user-selectable options, a first option for adding a new trigger event and a second option for adding a new action. If the first option for adding the new trigger event is selected, then the user interface 200 may display the new function block 220 only including the new trigger event option 222. Similarly, if the second option for adding the new action is selected, then the user interface 200 may display the new function block 220 only including the new action option 226.

The add new trigger event option 222 includes a type option 223 to select a type of trigger event. In response to detecting a user selection of the type option 223, the automated workflow application 121 may cause the user interface 200 to display a list of defined trigger events that are available to select. In some embodiments, the automated workflow application 121 populates the list of trigger events by accessing the trigger event table 126 stored in the trigger event database 125. The list of defined trigger events may be displayed in various ways. For example, the list may be displayed as a drop-down menu including entries for each trigger event. In some implementations, selecting the type option 223 may cause the user interface 200 to display an additional block or window including the list of trigger events or a drop-down menu of trigger events. The user may select a desired trigger event from the displayed list.

The type option 223 to select the type of trigger event may also include a field option 224 to the user may interact with to specify variables associated with the type of trigger event. The user interface 200 may present the field option 224 after the type of trigger event has been selected using the type option 223. For instance, the field option 224 may be included in the additional block or window mentioned in the previous paragraph. The field option 224 may vary depending on the type of trigger event. In addition, the field option 224 may include several fields for specifying multiple options related to the trigger event. After detecting selection of the field option 224, the automated workflow application 121 may display via the user interface 200 one or more fields that the user can enter information into or make selections from. For example, the field option 224 may include a drop-down menu with pre-defined options related to the trigger event. Additionally or alternatively, the field option 224 may include a blank field that the user can select and enter information into (e.g., by typing a particular option using the client device 102). The automated workflow application 121 may populate the possible fields associated with each type of trigger event using the trigger event data from the trigger event database 125. In some cases, a type of trigger event may not include a field option 224.

The add new action option 226 includes a type option 227 to select a type of action. The type option 227 for actions functions in an analogous way as the type option 223 for trigger events, but, in some embodiments, is populated using the list of actions by accessing the action table 128 stored in the action database 127. The type option 227 may also include a field option 228 which functions in an analogous way as the field option 224 for trigger events. The user may interact with the field option 228 to specify variables associated with the type of action. The automated workflow application 121 may populate the possible fields associated with each type of action using the action data from the action database 127. In some cases, a type of action may not include a field option 228.

To further explain the types of trigger events included in the list of trigger events, the types of actions included in the list of actions, and the fields associated with the trigger events and the actions, examples of trigger events and actions are discussed below.

The trigger events may correspond, for example, to completion of a document review-related task. Components of the environment 100, such as the document review platform applications 122, the external database 135, and the third party servers 140, may write parameters of data to the data bus 130 in response to certain events occurring or actions being completed. The data bus monitor 131 may detect the occurrence of trigger events by monitoring for the parameters of data associated with each trigger event, as indicated to the data bus monitor 131 by the instructions included the logic-based representation of the workflow, As one example, a trigger event included in the list of trigger events may correspond to collection of a new document or set of documents at the staging area 118 of the document review platform 115, as mentioned above. An example field option 224 associated with this type trigger event is an option to select collection of a document from a particular application. For instance, a field option may be to select an external database 135 or an application of the third-party applications 143 from which the document may originate. A different field option may be to select the importation application 122a, such that the trigger event corresponds to the importation application 122a collecting a new document. As one example of how these field options may be displayed, after the user interface 200 detects selection of the field option 224, the user interface may display a multi-select checkbox with options including "any application" or particular applications. Other field options may be to select certain types of documents, such as emails, images, or text files.

Another trigger event may correspond to ingestion of a new document or set of documents to the workspace 119 of the document review platform 115, as mentioned above. The ingestion trigger event may have similar field options as the example collection trigger event. For example, a field option may be to select the importation application 122a, such that the trigger event corresponds to the importation application 122a causing the workspace 119 to ingest a new document. Other field options may correspond to selecting certain types of documents, or selecting documents that have undergone certain pre-processing techniques, such as OCR or email threading.

Additional types of trigger events may correspond to a search index build completing, an analytics index build completing, a structured analytics set build completing, a document review platform script completing, or an OCR task completing. The trigger events may be associated with operations of the document review platform applications 122. Example field options 224 associated with such trigger events may include an option to select any such build or script completing, or may include options to select a specific build or script or multiple builds or scripts. For instance, a field may present a user with the option of selecting a specific search index completing. After the user selects such an option, the user interface 200 may present multiple fields for selecting from different specific search indexes completing.

Another example trigger event included in the list of trigger events may correspond to a particular date or to a particular time. The field option 224 includes fields to enter or select a particular date or a particular time. The fields may also include an option to select a time zone, with the default time zone being the time zone of the client device 102 or the automated workflow application 121.

Still further, the list of trigger events may include a trigger event corresponding to an automated workflow completing. The field option 224 may include a dropdown menu with a list of other automated workflows the particular user or other users have previously created. As a result, a user may be able to link multiple automated workflows together using the techniques described with respect to building a single automated workflow.

Another example trigger event includes a change in a saved search. The saved search, for example, may be a search the user has previously saved using the search application 122b of the document review platform 115. A change in a saved search may occur, for example, when the results of a saved search change in response to additional documents being ingested into the workspace 119 of document review platform 115 by the importation application 122*a*. The search application 122*b* may push updates to the data bus 130 when the results of a saved search change, such that the data bus monitor 131 can detect the change.

Another example trigger event may be detection of a manual trigger. For example, the trigger event may correspond to detection of a manual selection of an option by a user interacting with the automated workflow application 121, an application of the document review platform applications 122, and/or a companion application executing on the client device 102.

Additional trigger events may correspond to a cluster set build completing or an imaging set completing. For example, the trigger event may correspond to the analytics application 122*c* completing a cluster set build or to the imaging application 122*d* completing an imaging set.

As with trigger events, each action may correspond to a type of document review-related task. The data bus monitor 131 may push instructions corresponding to the action to the components of the environment 100 via the data bus 130 (or, in some embodiments, another communication link) if a corresponding trigger event or previous action is completed. The data bus monitor 131 formats the instructions in accordance with the instructions included in the logic-based representation of the workflow.

Types of actions included in the list of actions may include document review tasks such as building a search index, running a search terms report, building a conceptual analytics index, clustering documents, performing OCR on a set of documents, or imaging a set of documents. For example, the actions may correspond to calling an API of an application of the document review platforms 122. These actions may be performed, for example, on a document or a set of documents in the staging area 118 or the workspace 119, as discussed above. The field option 228 may include fields for selecting a pre-defined task of the type of document review task (e.g., a previously defined search index), or creating a new task of the type of document review task (e.g., creating a new search index). These fields may include sub-fields (e.g., additional field options that the user interface 200 presents after detecting selection of the field option 228) for specifying additional variables associated with the document review task.

For example, sub-fields associated with building a search index or building a conceptual analytics set may include options for entering a name of the index or set and/or designating specific searchable sets. Sub-fields associated with running a search terms report may include options for specifying variables of a new search terms report, including the name, index, searchable set, type of the new search terms report, and whether to calculate unique hits. Sub-fields associated with clustering documents may include fields to create a new cluster (e.g., to specify a name and analytics index to use to create the new cluster). Still further, sub-fields associated with performing optical character recognition on a document set may include fields to specify variables for the OCR set (e.g., a name of the OCR set, a particular data source, an OCR profile, and/or a destination field). Similarly, sub-fields associated with imaging a set of documents may include fields to specify variables for the imaging set (e.g., a name of the imaging set, a data source, and/or an imaging profile).

Another action may correspond to sending a message, such as an e-mail, a Slack message, a tweet, or other form of messaging. A field option 228 may include fields for entering particular email/messaging application addresses as well as text and/or parameters to include in the message body. For example, the action may correspond to calling a messaging application of the third-party applications 143.

Yet another action may correspond to running a structured analytics set. Fields associated with such an action may include fields to select a name for the set, a data source, operations such as email threading, name normalization, textual near duplicate identification, and language identification, and variables associated with the operations (e.g., languages, destination email thread group, and/or destination email duplicate identification).

Further, an action may correspond to running a document review platform script, such as a script associated with a particular application of the document review platform applications 122. The field option 228 may include a field to select a previously-saved document review platform script or enter a new script.

Another example action may correspond to tagging documents in a saved search, with fields for selecting a data source and/or showing a mass edit layout. In addition, an action may correspond to moving documents to a folder, with fields for selecting a data source and/or a folder.

As mentioned previously with respect to FIG. 10, a user can also add new types of trigger events and new types of actions that are not defined within the trigger event database 125 or the action database 127. The user interface may include a user-selectable "add new type of trigger event" option 230 and a user-selectable "add new type of action" option 232. The option 230 and the option 232 may also be displayed within a single block, or may be represented by a single option such as an "add new type of trigger event or action" option. When the user interface 200 detects selection of option 230 or option 232, the user interface 200 may display a new window with fields the user may populate with information concerning the desired trigger event or action, respectively. The fields prompt the user for information sufficient to generate a new definition of the new type of trigger event or action. For example, the information may include the format of an application programming interface (API) call corresponding to the desired action. The information may also include an event, which may correspond to an event of a document review platform application or script, corresponding to the desired trigger event.

The automated workflow application 121 may generate, or cause another application or device to generate, a definition for the trigger event or the new action. For example, the automated workflow application 121 may communicate the user-provided information regarding the new trigger event or the new action to the document review platform 115, which may generate the definition for the new trigger event or the new action. The new definition is then stored in the trigger event database 125 or the action database 127 by the automated workflow application 121 or the document review platform 115. After the new definition is stored, the new trigger event or action will appear in the list of trigger events or the list of actions after the user selects the option 222 or the option 226.

After the user has completed designing the workflow, as will be further described below with respect to FIGS. 3-4, the user may save the workflow by selecting the save option 240. A user may still continue to edit a saved workflow by interacting with the options within the user interface 200 and, more particularly, within the canvas area 208. Further, the user interface 200 includes a ready option 250 that the user may select to indicate to the automated workflow application 121 that the saved workflow is ready for deployment. In some implementations, the automated workflow application 121 may generate the logic-based representation of the workflow after detecting selection of the save option 240. In other implementations, the automated workflow application 121 for a saved workflow after detecting selection of the ready option 250. In response to detecting a selection of the ready option 250, the automated workflow application 121 deploys the logic-based representation of the workflow to the data bus 130.

Figure 3:
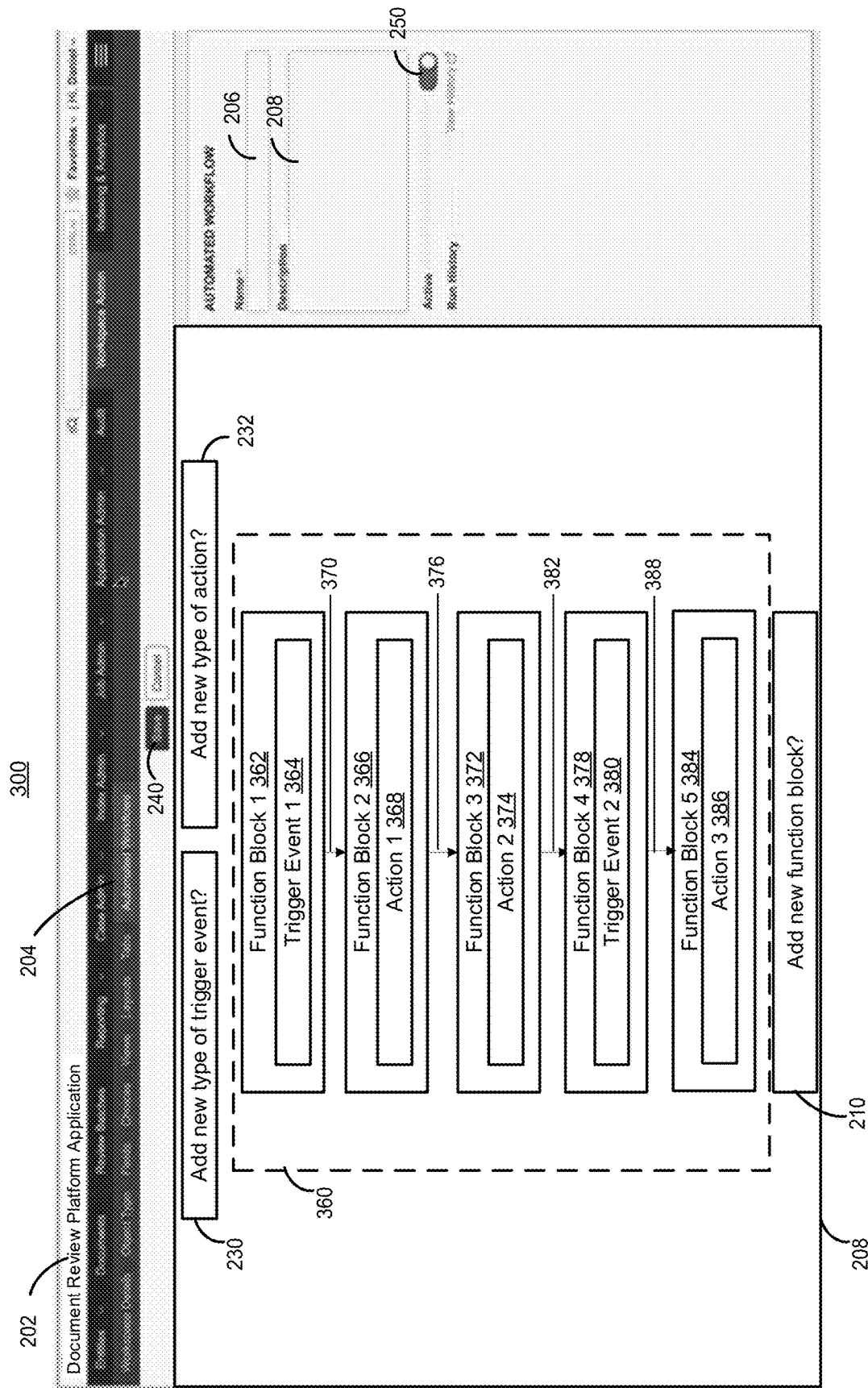
FIG. 3 is another example workflow editor user interface presented by a client device interacting with an automated workflow application of the document review platform, in accordance with an example embodiment.

FIG. 3 is another example workflow editor user interface 300 presented by the client device 102 interacting with the automated workflow application 121 of the document review platform 115 in order to design a workflow. The example workflow editor user interface 300 may be presented by the client device 102 after the user has made several selections of the add new function block option 210. Each time the automated workflow application 121 detects a selection of the add new function block option 210, the automated workflow application 121 may cause the workflow editor user interface 200 to include an additional function block. Thus, the workflow editor user interface 300 depicts the workflow editor user interface 200 after adding additional function blocks to the depicted workflow.

The workflow editor user interface 300 includes five function blocks, 362, 366, 372, 378, and 384. The collection of function blocks and the relationships between the function blocks make up workflow 360. Each function block corresponds to either a selected trigger event or a selected action. The function blocks are graphical representations indicating the placement of trigger events and actions within the workflow.

The automated workflow application 121 adds function block 362 to the workflow 360 after detecting a first selection of the add new function block option 210. The function block 362 ("function block 1") includes a trigger event 364 ("trigger event 1"). The automated workflow application 121 adds the trigger event 364 in response to receiving the user's selection of the add trigger event option 222, the type option 223, and possibly the field option 224 if the selected type of trigger event includes a field. The trigger event 364 may include information relating to the selected type of trigger event and the selected fields. For instance, the trigger event 364 may indicate the name of the type of trigger event and the variables corresponding to the selected fields.

The automated workflow application 121 adds function block 366 ("function block 2") to the canvas area 208 after detecting a second selection of the add new function block option 210. The function block 366 includes an action 368 ("action 1"). The automated workflow application 121 adds the action 368 to the workflow 360 in response to receiving the user's selection of the add action option 226, the type option 227, and possible the field option 228 if the selected type of action includes a field. Similar to the trigger event 364, the action 368 may include information relating to the selected type of action and the selected fields.

After the canvas area 208 includes at least two function blocks, the automated workflow application 121 includes in the user interface 300 a relationship element indicating the order in which the function blocks should be executed after the workflow is deployed. In example workflow editor user interface 300, the first relationship element is arrow 370. Relationship elements may be indicated by other designs, such as lines, brackets, and other suitable flowchart symbols. The arrow 370 indicates that if the workflow is deployed, the action corresponding to the action 368 will be performed after the trigger event corresponding to the trigger event 364 occurs. The automated workflow application 121 may by default insert an arrow when a second function block is added to the canvas area 208. Additionally or alternatively, the automated workflow application 121 may present via the user interface 300 a request for the user to indicate the relationship between the function blocks already present in the workflow 360 and the new function block. The automated workflow application then may display via the user interface 300 a suitable relationship element based on the user input.

The user also may select the function blocks in the workflow 360 and move the function blocks to new locations in the canvas area 208 (e.g., by clicking on a function block and dragging it to a new location in the canvas area 208). The automated workflow application 121 may detect the locations of the function blocks and automatically determine the user's desired relationships between the function blocks based on the locations. The automated workflow application 121 then may insert appropriate relationship elements.

Continuing with FIG. 3, the user interface 300 also includes a function block 372 ("function block 3") and corresponding action 374 ("action 2"). The automated workflow application 121 may present the function block 372 after detecting a third selection of the add new function block option 210, in a manner analogous to presenting the function block 366. The user interface 300 also includes arrow 376 indicating that the action corresponding to the action 374 is to be performed after the action corresponding to the action 368. If an action directly follows another action, as action 374 follows action 368, the automated workflow application 121 may determine that the action 374 is to be initialized after the action 368 completes. In this way, the workflow 360 can be seen as including an inherent trigger event that does not need to be represented by a separate function block, with the inherent trigger event corresponding to the completion of the earlier action.

In some cases, a user may indicate that an action in the workflow is not to be performed until an additional trigger event besides the completion of the earlier action. For example, user interface 300 includes a function block 378 ("function block 4") which includes a trigger event 380 ("trigger event 2"). Arrow 382 indicates that the data bus monitor 131 should monitor for the trigger event 380 following completion of the action 374. The user interface 300 further includes function block 384 ("function block 5") including action 386 ("action 3"). Arrow 388 indicates that the action 386 should be performed following occurrence of the trigger event 380.

Figure 4:
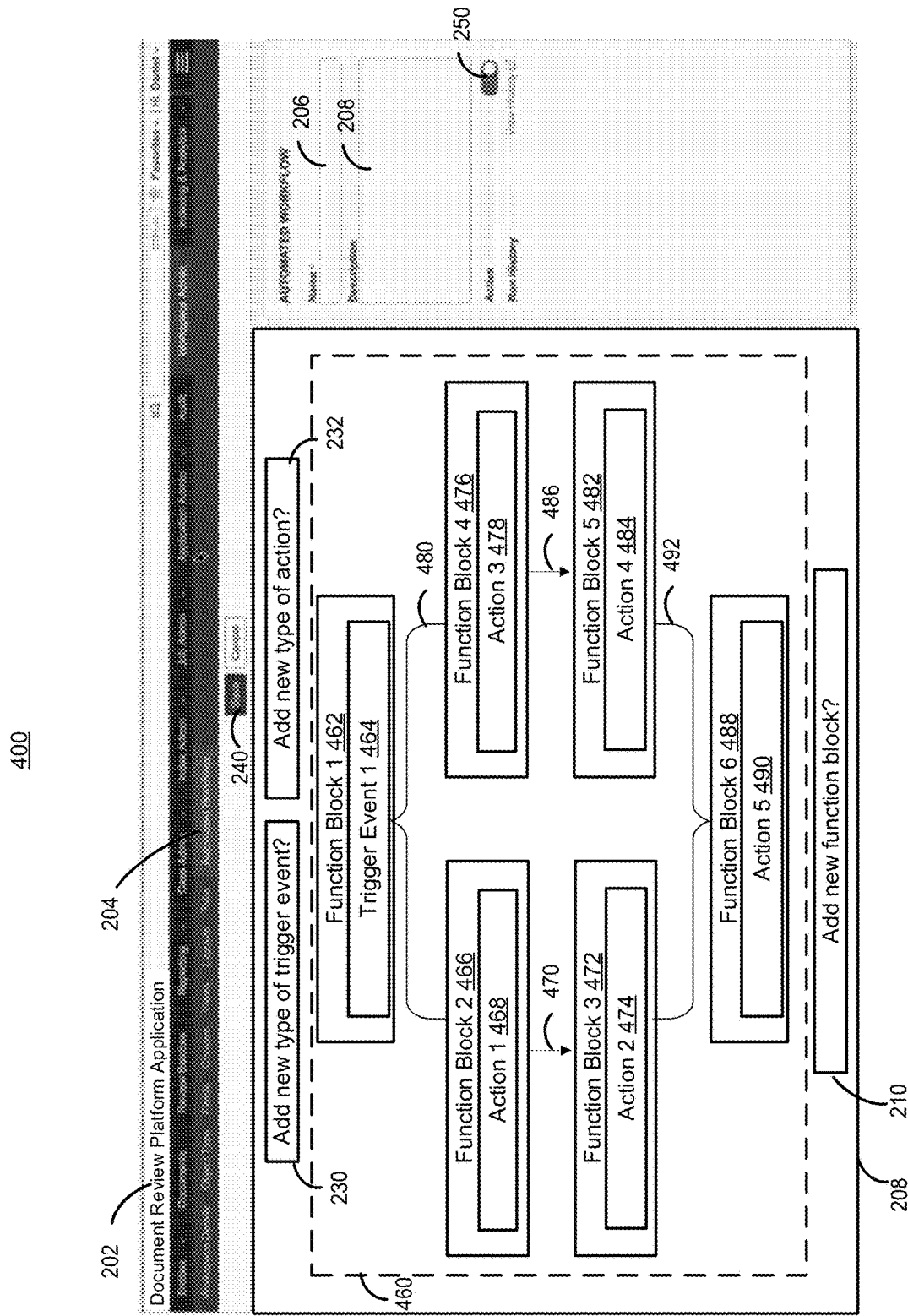
FIG. 4 is yet another example workflow editor user interface presented by a client device interacting with an automated workflow application of the document review platform, in accordance with an example embodiment.

FIG. 4 is yet another example workflow editor user interface 400 presented by the client device 102 interacting with the automated workflow application 121 of the document review platform 115 in order to design a workflow. The workflow editor user interface 400 may be presented by the client device 102 after the user has made several selections of the add new function block option 210. While FIG. 3 depicts a workflow corresponding to the workflow 360, FIG. 4 represents a different workflow, workflow 460, designed by the user providing different user input.

The workflow 460 includes function blocks 462, 466, 472, 476, 482, and 488. Each of these function blocks and their corresponding trigger events or actions may be added to the user interface 300 after the automated workflow application 121 detects selections of the add new function block option 210. For example, the automated workflow application 121 may add function block 462 ("function block 1") and trigger event 464 ("trigger event 1") to the workflow 460 in a similar manner as the application 121 adds function block 362 and the trigger event 364 to the workflow 360. The automated workflow application 121 may also add function block 466 ("function block 2") and the function block 472 ("function block 3") (and action 468 ("action 1") and action 474 ("action 2"), respectively) in a similar manner as the application adds function block 366 and function block 372 to the workflow 360.

In FIG. 4, the automated workflow application 121 also adds function block 476 ("function block 4") including action 478 ("action 3"), and function block 482 ("function block 5") including action 484 ("action 4"), to the workflow 460. The user may indicate that the action 478 and the action 484 are to be performed in parallel with the action 468 and the action 474. The user may, for example, move the function block 476 to the side of and at equal vertical height within the canvas area to function block 466. The automated workflow application 121 may detect, based on the location of the function block 476 in relation to the function block 466, that the function block 476 is to be performed in parallel with the function block 466. Additionally or alternatively, in response to detecting user input to add the function block 476, the automated workflow application 121 may present via the user interface 400 a request for the user to indicate the relationship between the function blocks already present in the workflow 460 and the function block 476. The user's response may indicate that the function block 476 is to be performed in parallel with the function block 466.

Based on the user input indicating the desired parallel relationship between the function block 476 and the function block 466, the automated workflow user interface may add bracket 480 to indicate the parallel relationship between the function blocks.

In workflow 460, after the trigger event 464, the action 468 is to be performed. After completion of the action 468, as indicated by arrow 470, the action 474 is to be performed. In addition, after the trigger event 464, the action 478 is also to be performed, followed by the action 484 as indicated by the arrow 486. Thus, the workflow 460 indicates that the group of actions including the action 468 and the action 474 is to be performed concurrently with the group of actions including the action 478 and the action 484. The action 474 does not have to begin at the same time as the action 484, but should be initialized after completion of the action 468.

The bracket 492 indicates that after the completion of the action 474 and the action 484, action 490 ("action 5") included within function block 488 ("function block 6") should be performed. In some implementations, the user may also specify that the action 490 should be performed after completion of any one of the action 474 or the action 484.

The user may save the workflow 360 and the workflow 460 using the user-selectable save option 240. Saved workflows may be used as templates. For example, a user may save workflow 360 as a template workflow. The user may then access the template workflow, modify it as necessary for the user's desired tasks, and save and/or deploy the new modified workflow. Saved workflows also may be inserted into other workflows. For example, the workflow editor user interfaces 300, 400 may include an additional user-selectable option to insert an existing workflow. The option to insert an existing workflow may also be incorporated into the add new function block option 210. After detecting selection of the option to insert an existing workflow, the automated workflow application 121 may present to the user via the user interfaces 300, 400 a list of saved workflows that the user may select. For example, automated workflow application 121 may be configured to enable the user to insert the workflow 460 into the workflow 360 after the function block 5 384, indicating that the workflow 460 is to be executed after the function blocks already in workflow 360. The automated workflow application 121 may also enable a user to insert the workflow 460 into the workflow next to the workflow 360 in such a way as to indicate that the workflow 460 should be executed in parallel with the workflow 360. For example, the automated workflow application 121 may enable a user to insert the workflow 460 in the canvas area 208 next to the workflow 360.

Upon saving a workflow (e.g., workflow 360 or 460), the automated workflow application 121 translates the workflow into a logic-based representation of the workflow. Additionally or alternatively, the automated workflow application 121 may translate the workflow into a logic-based representation of the workflow upon detecting user input indicating that the workflow is ready for deployment (e.g., by receiving an indication of user selection of ready option 250). The automated workflow application 121 deploys the logic-based representation of the workflow upon detecting user selection of the ready option 250.

To translate the workflow into a logic-based representation of the workflow, the automated workflow application 121 translates the function blocks and visual relationship elements designed via the automated workflow application 121 into a logical format executable by the data bus monitor 131. Said another way, the automated workflow application 121 may use one format (e.g., a first JavaScript Object Notation (JSON) structure)) that instructs the client device 102 how to display a workflow (e.g., the workflow 360 on the user interface 300). The automated workflow application 121 then translates the first format to a second format (e.g., a second JSON structure) that includes instructions as to how to implement the workflow.

Figure 5A:
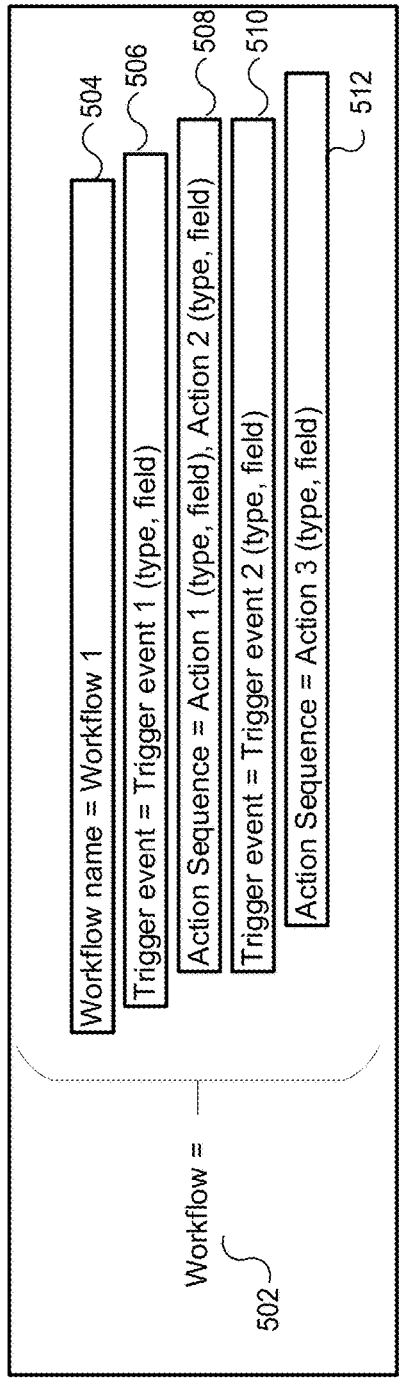
FIGS. 5A-5B are block diagrams illustrating example logic-based representations of workflows.
Figure 5B:
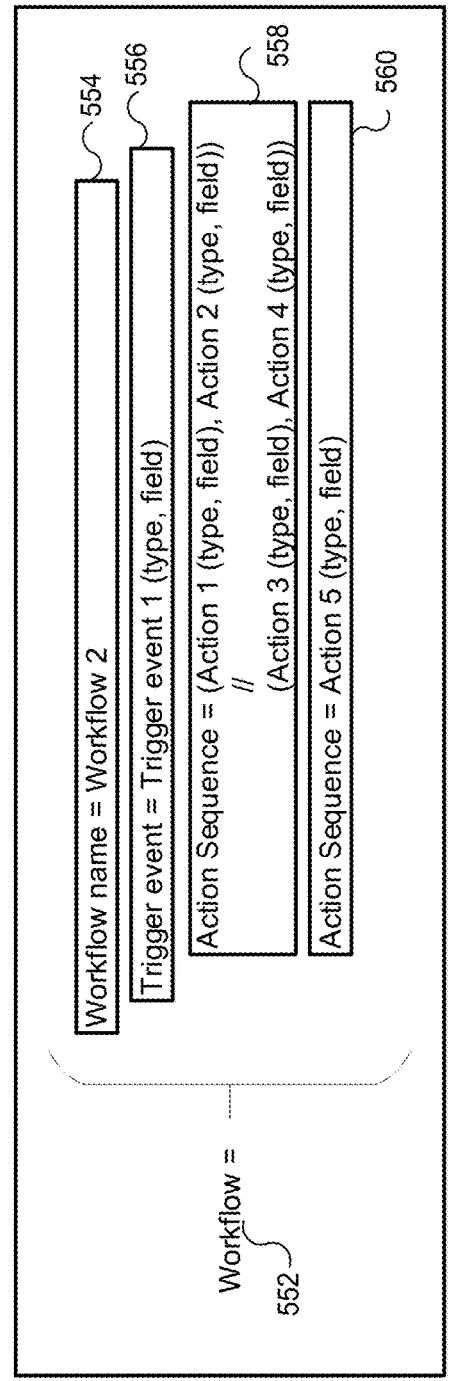

FIGS. 5A-5B are block diagrams illustrating example logic-based representations and of workflows. The example logic-based representation 500 depicted in FIG. 5A corresponds to the workflow 360 depicted in FIG. 3, and the example logic-based representation 550 depicted in FIG. 5B corresponds to the workflow 460 depicted in FIG. 4.

Beginning with FIG. 5A, the automated workflow application 121 translates the workflow 360 into the logic-based representation 500. The logic-based representation 500 may be, for example, a set of computer-readable instructions (e.g., software code) generated by the automated workflow application 121 and corresponding to the workflow 360. The logic-based representation 500 is readable by the data bus monitor 131 to determine the elements of the workflow 360. For example, the data bus monitor 131 may determine, from the logic-based representation 500, which trigger events to monitor for, which actions to perform, and in what order.

The logic-based representation 500 includes a definition 502 of the workflow 360. The definition 502 includes a code block 504 corresponding to the workflow name. The automated workflow application 121 determines the workflow name based on the user input from name option 206 and includes this in the code block 504.

The definition 502 also includes a code block 506 corresponding to trigger event 364 The automated workflow application 121 determines the code block 506 based on the user selections detected in relation to the function block 362 including trigger event 364. The code block 506 includes the selected type of trigger event and entries made in the fields corresponding to the selected type of trigger event. For example, the code block 506 may include variables corresponding to the selections the user made using the field option 224. The code block 506 may also include instructions for monitoring for the trigger event (e.g., which application(s) and/or computing device(s) to monitor to determine whether the trigger event has occurred). The automated workflow application 121 may populate the instructions using the trigger event table 126 in the trigger event database 125. The code block 506 also may include an indication of the action sequences associated with the trigger event 364 (e.g., the indication may point to code block 508 including an action sequence).

The definition 502 also includes code block 508 corresponding to an action sequence comprised of action 368 followed by action 374. The automated workflow application 121 determines the code block 508 based on the selections made in relation to the action 368 and the action 374 using the user interface 300. For example, the code block 508 includes the types of actions and fields corresponding to the selected types of actions. Similar to the code block 506, the code block 508 may also include instructions for performing the action (e.g., which application(s) to communicate with and how to format the communication in accordance with a corresponding API). The automated workflow application 121 may populate the instructions using the action table 128 in the action database 127.

As an example, if the trigger event 364 corresponds to collection of a new document at the staging area 118 or ingestion of a document to the workspace 119, then the code block 506 may include instructions that cause the data bus monitor 131 to monitor for new documents entering the staging area 118 or the workspace 119. The data bus monitor 131 may monitor the data bus 130 to detect when the document review platform 115 posts to the data bus 130 that documents have been collected at the staging area 118 or ingested to the workspace 119. If the data bus monitor 131 detects that documents have been collected or ingested, then the data bus monitor 131 may instruct one of the components of the environment 100 to perform the action 374. For example, if the trigger event 364 corresponds to collection of a new document at the staging area 118, then the action 374 may correspond to a pre-processing action, such as OCR, email threading, or highlighting. The data bus monitor 131 may send an instruction to the document review platform 115 to perform the pre-processing action. As another example, if the trigger event 364 corresponds to ingestion of a document to the workspace 119, then the action may correspond to a document review task, such as a task performed by the applications 122*b-d*. The data bus monitor 131 may send an instruction to the document review platform 115 to perform the document review task.

The automated workflow application 121 also includes in the logic-based representation of the workflow a translation of the relationship elements of the workflow. For example, the automated workflow application 121 may order the code blocks included in the definition 502 in order to indicate to the data bus monitor the relationships between the trigger events and actions. Additionally or alternatively, the automated workflow application 121 may include relationship variables within the definition 502 to indicate the relationships between the trigger events and actions.

Further, the definition 502 includes code blocks for any additional trigger events and/or action sequences included in the workflow. For example, the definition 502 includes a code block 510 corresponding to trigger event 380. The automated workflow application 121 determines the code block 510 using the selections made using the user interface 300 in relation to the trigger event 380. The definition 502 further includes code block 512 corresponding to an action sequence to be performed after trigger event 380 and including action 386. The code block 512 includes the type of action and fields selected using the user interface 300 in relation to the action 386.

Continuing on to FIG. 5B, the automated workflow application 121 may, in a manner similar to the description for FIG. 5A, translate the workflow 460 into the logic-based representation 550. The logic-based representation 550 includes a definition 552 of the workflow 460. The definition includes code blocks describing the workflow name 554, a trigger event 556, and action sequences 558, 560. The code block 558, for example, corresponds to the function blocks 466, 472, 476, and 482 and includes the types of actions and fields corresponding to the actions selected in relation to action 468, action 474, action 478, and action 484. The code block 558 may also include one or more relationship variables indicating that action 468 and action 474 are to be performed in parallel with action 478 and action 484. The code block 560 corresponds to the function block 488 and includes the type of action and fields corresponding to the selections made in relation to action 490.

The code blocks corresponding to trigger events and actions (e.g., code block 506-512 and 556-560) may also include instructions to the data bus monitor 131 to communicate status information regarding the corresponding trigger event or action to the automated workflow application 121. For example, the code block 506 may include a request to communicate a message to the automated workflow application 121 when the trigger event 1 occurs. Similarly, the code block 506 may include a request to communicate a message to the automated workflow application 121 when the action 1 and/or the action 2 is completed. The request may also be to communicate a message to the automated workflow application 121 when certain events of the action 1 and/or the action 2 are completed. In this way, the automated workflow application 121 can receive updates regarding the status of deployed workflows.

Figure 6:
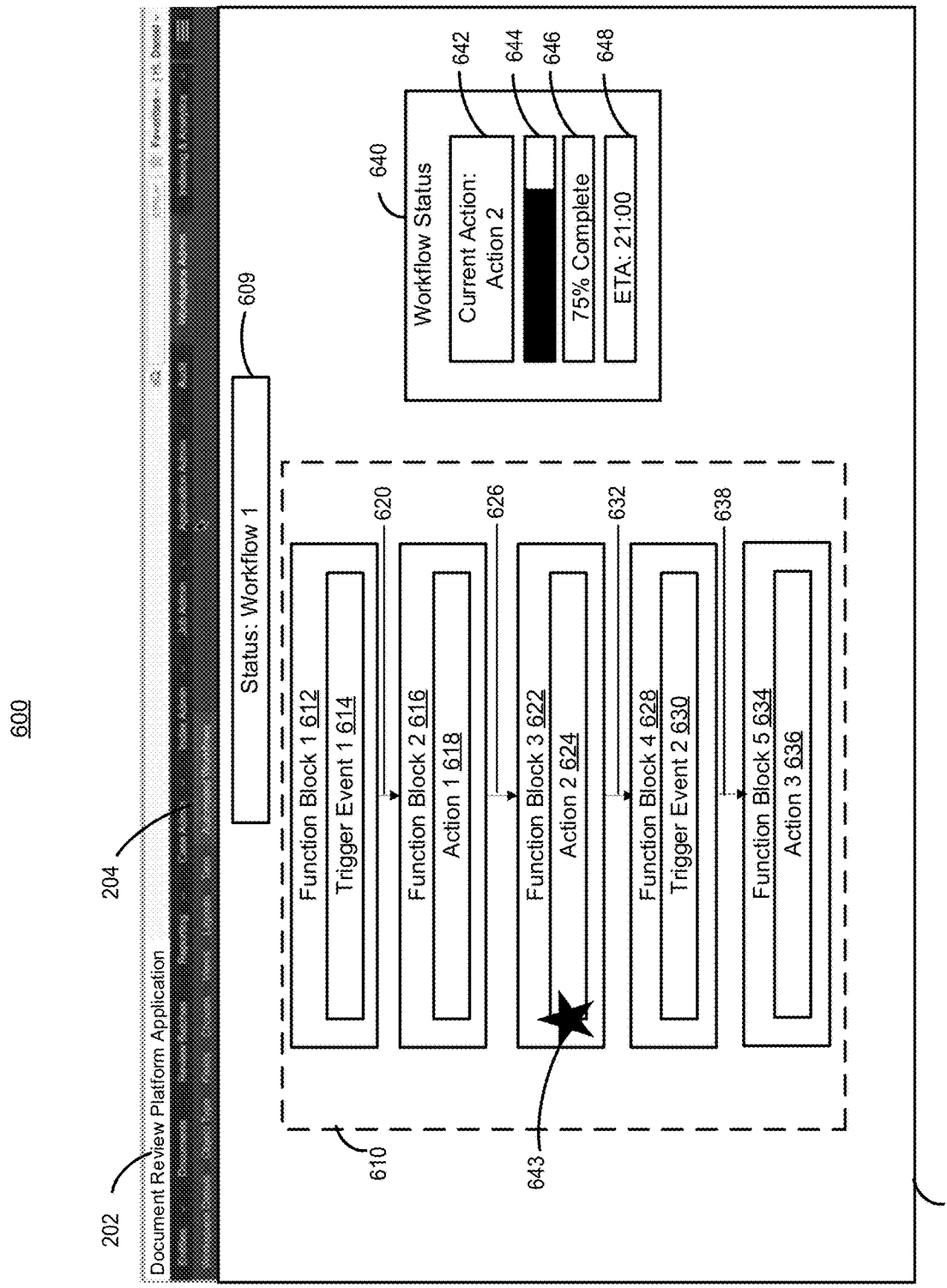
FIG. 6 is an example workflow monitoring user interface presented by a client device interacting with an automated workflow application of the document review platform in accordance with an example embodiment.

FIG. 6 is an example workflow monitoring user interface 600 presented by the client device 102 interacting with the automated workflow application 121 of the document review platform 115. After a workflow has been designed by a user and translated into a logic-based representation of the workflow by the automated workflow application 121, the automated workflow application 121 deploys the logic-based representation of the workflow.

The automated workflow application 121 can deploy the logic-based representation of a workflow by communicating with the data bus monitor 131. For example, the automated workflow application can deploy the logic-based representation of the workflow to data bus monitor 131 via a communication link of the network(s) 110. In order for the data bus monitor 131 to read the logic-based representation of the workflow, the automated workflow application 121 may need to include the logic-based representation of the workflow within a request formatted in accordance with an API associated with the data bus monitor 131.

The data bus monitor 131 reads the logic-based representation of the deployed workflow and executes the instructions within the logic-based representation. For example, the data bus monitor 131, upon detecting the trigger events included in the logic-based representation of the workflow, may push to the data bus 130 updates indicating that the included trigger events have occurred. The data bus monitor 131, over the data bus 130, also instructs the components of the environment 100 to perform the actions that follow the trigger event in the workflow. Thus, after the logic-based representation of the workflow is deployed, the trigger events are automatically monitored for and the corresponding actions are automatically performed in the order specified by the workflow.

The automated workflow application 121 can monitor the status of a deployed workflow and display the status using the user interface 600. The client device 102 may display the example user interface 600 using the display 106. The user may need to select additional sub-menu options of the automated workflow application 121 in order to cause the client device to display the user interface 600. For example, the user may need to select a menu option for monitoring deployed or active workflows, and may need to select additional sub-options in order to navigate to a specific workflow.

The user interface may include a page heading 609 indicating that the user interface 600 depicts the status of a particular workflow and may include the name of the workflow (e.g., Workflow 1). The user interface 600 includes a visual representation 610 of a workflow. In the example user interface 600, the visual representation 610 may correspond to the workflow 360 presented by the user interface 300. The visual representation 610 includes function blocks 612, 616, 622, 628, and 634 corresponding to the function blocks of the workflow. Each of the function blocks includes either a trigger event (e.g., trigger event 1 614 and trigger event 2 630) or an action (e.g., action 1 618, action 2, 624, and action 3 636). The visual representation 610 of the workflow corresponds to a saved, deployed workflow. To enable a user to edit the saved workflow, the automated workflow application 121 is configured to present for example, the user interface 300. The window 608 of the user interface 600, rather than being a canvas area to move around the function blocks, is a window displaying the status of the deployed workflow.

The user interface 600 may include a status summary block 640 which includes information related to the status of the deployed workflow. For example, the status summary block 640 may include a block 642 indicating the action that is currently being performed. The visual representation 610 of the workflow may include a marker 643 such as a star on the current action or may otherwise indicate the current action using colors or other suitable markings. The status summary block 640 may include a status bar 644 indicating the progress of the current action. In some implementations, the status bar 644 may instead indicate the progress of the workflow as a whole, or a second status bar may indicate the progress of the workflow as a whole. Still further, a block 646 may present a quantitative percentage of the progress of the current action, or of the workflow as a whole. The status summary block 640 may also include an estimated ETA 648 of the current action and/or the workflow. In various implementations, the status summary block may include only one of 642, 644, 646, or 648, or may include a combination of these features.

The automated workflow application 121 receives updates from the data bus monitor 131 in order to populate the status summary block 640. The updates may be based on requests included in the logic-based representation of the deployed workflow (e.g., the logic-based representation 500).

Figure 7:
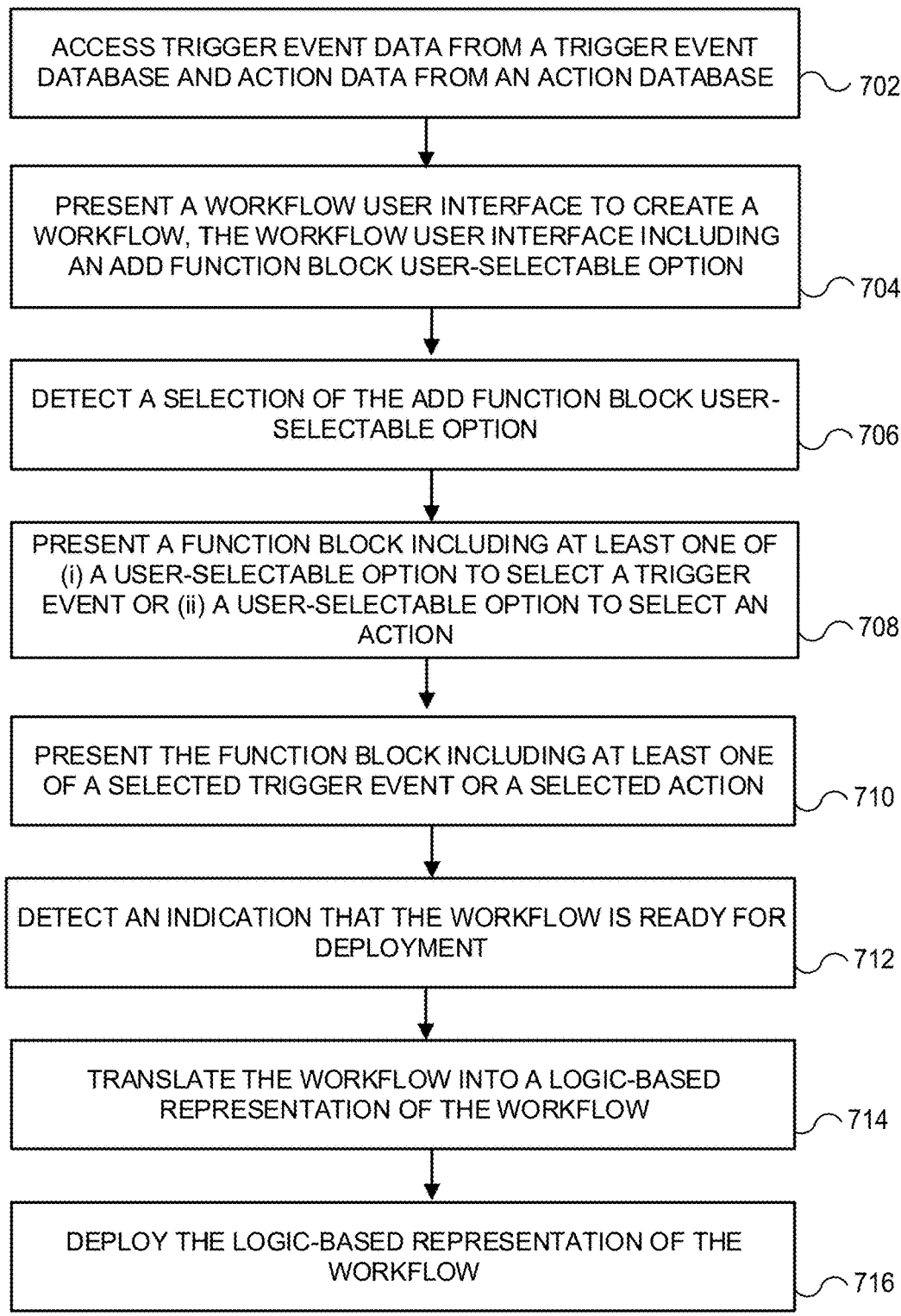
FIG. 7 is an example flow diagram for building automated workflow sequences associated with a document review platform.

FIG. 7 is an example flow diagram 700 for building automated workflow sequences associated with a document review platform (e.g., the document review platform 115), which can be implemented in the environment 100 of FIG. 1. More particularly, the method 700 may be executed, in part, by the automated workflow application 121 in conjunction with the document review platform 115.

The method 700 begins by accessing trigger event data from a trigger event database (e.g., the trigger event database 125 of FIGS. 1A and 1C) and action data from an action database (e.g., the action database 127 of FIGS. 1A and 1C) (block 702). The trigger event data and action data include definitions of trigger events and actions, respectively. As one example, a definition of an trigger event may indicate a parameter of data communicated over a data bus or an identifier associated with a data bus. The trigger event may correspond to a parameter of data being written to the data bus 130 or to a parameter of data being written to the data bus 130 from another data bus corresponding to the identifier. As another example, a definition of an action may correspond to a mapping of parameters to a format corresponding to a particular API. The method further includes presenting a workflow user interface (e.g., user interface 200 of FIG. 2) to create a workflow (block 704). The workflow user interface includes an add function block user selectable option (e.g., option 210 of FIG. 2).

The method includes adding a function block to the workflow by performing the steps of blocks 706-710. At block 706, the method includes detecting a selection of the add function block user-selectable option. The method further includes, in response to detecting a selection of the add function block user-selectable option, presenting a function block including at least one of (i) a user-selectable option to select a trigger event from a list of trigger events populated based on the trigger event data (e.g., option 222 of FIG. 2) or (ii) a user-selectable option to select an action from a list of actions populated based on the action data (e.g., option 226 of FIG. 2). The user-selectable options to select the trigger event or the action may include fields to select or provide further parameters regarding the trigger event or the action. After detecting user input indicating a selected trigger event or a selected action, the method includes presenting the function block (e.g., function block 362 of FIG. 3, function block 462 of FIG. 4) including the selected trigger event or the selected action (block 710).

The list of trigger events may include particular trigger events corresponding to completion of types of document review tasks. A type of document review task may be, for example, a search index build, an analytics build, a structured analytics set build, a document review platform script (e.g., a script associated with document review platform 115), or an OCR set build. Still further, the list of trigger events may include a particular trigger event corresponding to collection or ingestion of a document to the document review platform, a particular time, a particular date, completion of an automated workflow, a change in a saved search, completion of an imaging set, or completion of a cluster set build. The user-selectable option to select the trigger event for a particular trigger event may include fields related to the type of document review task Similarly, the list of actions may include particular actions corresponding to types of document review task. A type of document review task may be, for example, building a search index, running a search terms report, building a conceptual analytics index, performing OCR on a set of documents, or imaging a set of documents. Still further, the list of actions may include a particular action corresponding to executing a document review platform script, sending an email, running a structured analytics set, tagging documents in a saved search, or moving documents to a folder. The user-selectable option to select the action for a particular action may include fields to select a pre-defined document review task of the type of document review task, or a new document review task of the type of document review task.

In some embodiments, the automated workflow application 121 may be configured to repeat the steps of blocks 706-710 for each function block added to the workflow. If a second function block (e.g., function block 366 of FIG. 3, function block 476 of FIG. 4) is added to the workflow, then the method includes presenting a relationship element (e.g., arrow 370 of FIG. 3, bracket 480 of FIG. 4) indicating the relationship between the first function block and the second function block. The relationship element may indicate that the first function block (or a group of function blocks) is to be executed in parallel with, before, or after the second function block (or another group of function blocks). As additional functional blocks are added to the workflow, additional relationship elements may be presented to indicate the relationships between the functional blocks.

In some embodiments, the workflow editor user interface (e.g., user interface 200, 300, 400 of FIGS. 2-4), may include a user-selectable option to add a new trigger event to the list of trigger events (e.g., option 230 of FIGS. 2-4) and/or a user-selectable option to add a new action to the list of actions (e.g., option 232 of FIGS. 2-4). In response to the workflow editor user interface detecting a selection of the option to add a new trigger event, the method may further include generating a definition of the new trigger event and storing the definition of the new trigger event in the trigger event database (e.g., by creating a new entry in the trigger event table 126 stored in the trigger event database 125). Likewise, in response to the workflow editor user interface detecting a selection of the option to add a new action, the method may include generating a definition of the new action and storing the definition of the new action in the action database (e.g., by creating a new entry in the action table 128 stored in the action database 127). The user-selectable options to add a new trigger event or a new action may also include fields to enter parameters defining the new trigger event or the new action. These parameters may be included in the generated definition of the new trigger event or the new action.

At block 712, the method includes detecting an indication that the workflow is ready for deployment (e.g., by detecting a selection of the ready option 250 of FIGS. 2-4). The method further includes translating the workflow into a logic-based representation of the workflow (e.g., logic-based representations 500 and 550 of FIGS. 5A-5B) (block 714), and deploying the logic-based representation of the workflow (block 716).

After deploying the logic-based representation of the workflow, the method may include presenting a workflow user interface (e.g., user interface 600 of FIG. 6) to monitor the deployed logic-based representation of the workflow. The method may also include receiving a status of at least one selected action of the function blocks included in the workflow. In addition, the method may also include presenting an indication of the status via the workflow user interface (e.g., status summary block 640, marker 643 of FIG. 6).

IV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A system for building automated workflow sequences associated with a document review platform, the system comprising:
   a trigger event database configured to store trigger event data;
   an action database configured to store action data;
   one or more processors;
   one or more non-transitory memories coupled to the one or more processors, the trigger event database, and the action database and storing instructions associated with a first application of the document review platform that when executed by the one or more processors, cause the one or more processors to:

access, from the trigger event database, the trigger event data;
access, from the action database, the action data;
present a workflow editor user interface to create a workflow, the workflow editor user interface including:
an add function block user-selectable option;
one or more function blocks of the workflow, wherein the workflow editor user interface adds a function block to the workflow when the workflow editor user interface detects a selection of the add function block user-selectable option;
wherein the one or more function blocks include at least one of (i) a user-selectable option to select a trigger event from a list of trigger events populated based on the trigger event data or (ii) a user-selectable option to select an action from a list of actions populated based on the action data; and
one or more relationship elements indicating relationships between the one or more function blocks;
detect an indication that the workflow is ready for deployment, the workflow including one or more trigger events and one or more actions;
translate the workflow into a logic-based representation of the workflow; and
deploy the logic-based representation of the workflow to a data bus monitor, wherein deploying the logic-based representation of the workflow causes the data bus monitor to execute instructions to monitor a data bus for occurrences of the one or more trigger events.

2. The system of claim 1, wherein the instructions further cause the one or more processors to receive an instruction from the data bus monitor in response to the data bus monitor detecting an occurrence of a particular trigger event of the one or more trigger events, the instruction causing the one or more processors to perform a particular action of the one or more actions of the workflow.

3. The system of claim 2, wherein the particular trigger event is collection of a document at a staging area of the document review platform, and the particular action is a pre-processing action performed during ingestion of the document to a workspace of the document review platform.

4. The system of claim 2, wherein the particular trigger event is ingestion of a document to a workspace of the document review platform, and the particular action is a document review task performed by a second application of the document review platform.

5. The system of claim 1, wherein the trigger event data includes definitions of trigger events included in the list of trigger events, and wherein the action data includes definitions of actions included in the list of actions.

6. The system of claim 5, wherein the workflow editor user interface further includes a user-selectable option to add a new trigger event to the list of trigger events, and wherein the instructions further cause the one or more processors to:
generate a definition of the new trigger event in response to the workflow editor user interface detecting a selection of the user-selectable option to add the new trigger event; and
store the definition of the new trigger event in the trigger event database.

7. The system of claim 5, wherein the workflow editor user interface further includes a user-selectable option to add a new action to the list of actions, and wherein the instructions further cause the one or more processors to:
generate a definition of the new action in response to the workflow editor user interface detecting a selection of the user-selectable option to add the new action; and
store the definition of the new action in the action database.

8. The system of claim 7, wherein:
the user-selectable option to add the new action includes a field to enter parameters defining the new action; and
the definition of the new action includes a mapping of the parameters defining the new action to a format corresponding to an application programming interface (API).

9. The system of claim 5, wherein a definition included in the definitions of trigger events indicates at least one of a parameter of data communicated over a data bus or an identifier associated with a data bus.

10. The system of claim 1, wherein a relationship element of the one or more relationship elements indicates that a first function block of the one or more function blocks is to be executed at least one of (i) in parallel with, or (ii) after, a second function block of the one or more function blocks.

11. The system of claim 1, wherein the list of trigger events includes a particular trigger event corresponding to completion of a type of document review task.

12. The system of claim 11, wherein the type of document review task is: a search index build, an analytics index build, a structured analytics set build, a document review platform script, or an optical character recognition (OCR) set build.

13. The system of claim 1, wherein the list of actions includes a particular action corresponding to a type of document review task, and wherein the user-selectable option to select the action for the particular action includes a field to select at least one of (i) a pre-defined document review task of the type of document review task, or (ii) a new document review task of the type of document review task.

14. The system of claim 13, wherein the type of document review task is: building a search index, running a search terms report, building a conceptual analytics index, clustering documents, performing optical character recognition (OCR) on a set of documents, or imaging a set of documents.

15. A method for building automated workflow sequences associated with a first application of a document review platform performed by one or more processors, the method comprising:
accessing, from a trigger event database, trigger event data;
accessing, from an action database, action data;
presenting a workflow editor user interface to create a workflow, wherein the workflow editor user interface includes an add function block user-selectable option;
adding a function block to the workflow by:
detecting a selection of the add function block user-selectable option;
presenting, via the workflow editor user interface, a function block in response to detecting the selection of the add function block user-selectable option, the function block including at least one of (i) a user-selectable option to select a trigger event from a list of trigger events populated based on the trigger event data or (ii) a user-selectable option to select an action from a list of actions populated based on the action data; and
presenting the function block including at least one of a selected trigger event or a selected action;

detecting an indication that the workflow is ready for deployment, the workflow including one or more trigger events and one or more actions;

translating the workflow into a logic-based representation of the workflow; and deploying the logic-based representation of the workflow to a data bus monitor, wherein deploying the logic based-representation of the workflow causes the data bus monitor to execute instructions to monitor a data bus for occurrences of the one or more trigger events.

16. The method of claim 15, further comprising:

receiving an instruction from the data bus monitor in response to the data bus monitor detecting an occurrence of a particular trigger event of the one or more trigger events, the instruction causing the one or more processors to perform a particular action of the one or more actions of the workflow.

17. The method of claim 16, wherein the particular trigger event is collection of a document at a staging area of the document review platform, and the particular action is a pre-processing action performed during ingestion of the document to a workspace of the document review platform.

18. The method of claim 16, wherein the particular trigger event is ingestion of a document to a workspace of the document review platform, and the particular action is a document review task performed by a second application of the document review platform.

19. The method of claim 15, wherein the function block is a first function block, and wherein the method further comprises:

before detecting an indication that the workflow is ready for deployment, adding a second function block to the workflow; and presenting a relationship element indicating the relationship between the first function block and the second function block.

20. The method of claim 15, further comprising:

after deploying the logic-based representation of the workflow, presenting a workflow user interface to monitor the deployed logic-based representation of the workflow;

receiving a status of at least one selected action of the function blocks included in the workflow; and presenting an indication of the status via the workflow user interface.

21. The method of claim 15, wherein the list of trigger events includes a particular trigger event corresponding to collection of a document in the document review platform, ingestion of a document to the document review platform, a particular time, a particular date, completion of an automated workflow, a change in a saved search, completion of an imaging set, or completion of a cluster set build.

22. The method of claim 21, wherein presenting the user-selectable option to select the trigger event from the list of trigger events comprises:

presenting a field corresponding to the particular trigger event.

23. The method of claim 15, wherein the list of actions includes a particular action corresponding to executing a document review platform script, sending an email, running a structured analytics set, tagging documents in a saved search, or moving documents to a folder.

24. The method of claim 23, wherein presenting the user-selectable option to select the action from the list of actions comprises:

presenting a field corresponding to the particular action.

25. The method of claim 15, wherein:

the list of trigger events includes a particular trigger event corresponding to completion of a type of document review task;

presenting the user-selectable option to select the trigger event for the particular trigger event includes presenting a field to select a document review task of the type of document review task; and the type of document review task is: a search index build, an analytics index build, a structured analytics set build, a document review platform script, or an optical character recognition (OCR) set build.

26. The method of claim 15, wherein:

the list of actions includes a particular action corresponding to a type of document review task;

presenting the user-selectable option to select the action for the particular action includes presenting a field to select at least one of (i) a pre-defined document review task of the type of document review task, or (ii) a new document review task of the type of document review task; and the type of document review task is: building a search index, running a search terms report, building a conceptual analytics index, clustering documents, performing optical character recognition (OCR) on a set of documents, or imaging a set of documents.

27. A tangible, non-transitory computer-readable medium storing instructions associated with a first application of a document review platform for building automated workflow sequences associated with the document review platform that, when executed via one or more processors of a computer system, cause the computer system to:

access, from a trigger event database, trigger event data;

access, from an action database, action data;

present a workflow editor user interface to create a workflow, wherein the workflow editor user interface includes an add function block user-selectable option;

add a function block to the workflow by:

detecting a selection of the add function block user-selectable option;

presenting, via the workflow editor user interface, a function block in response to detecting the selection of the add function block user-selectable option, the function block including at least one of (i) a user-selectable option to select a trigger event from a list of trigger events populated based on the trigger event data or (ii) a user-selectable option to select an action from a list of actions populated based on the action data; and presenting the function block including at least one of a selected trigger event or a selected action;

detect an indication that the workflow is ready for deployment, the workflow including one or more trigger events and one or more actions;

translate the workflow into a logic-based representation of the workflow; and deploy the logic-based representation of the workflow to a data bus monitor, wherein deploying the logic-based representation of the workflow causes the data bus monitor to execute instructions to monitor a data bus for occurrences of the one or more trigger events.

* * * * *